Patented Oct. 29, 1940

2,219,462

UNITED STATES PATENT OFFICE 2,219,462

WELDING ROD

William A. Wissler, Niagara Falls, N. Y., assignor to Haynes Stellite Company, a corporation of Indiana No Drawing. Application March 11, 1938, Serial No. 195,317

7 Claims. (Cl. 219—8)

This invention relates to welding rods used in forming fusion-deposited hard facings on metallic articles, and especially in forming hard facings containing as essential ingredients at least one metal of the group consisting of chromium, tungsten, molybdenum, columbium, and tantalum, and at least one metal of the group consisting of iron, cobalt and nickel, together with carbon in an amount not exceeding about 4%, the iron content not exceeding 25% and preferably not exceeding 15%. Up to 2% boron, up to 10% vanadium, up to 3% manganese, and up to 3% silicon may also be included.

An object of the invention is to provide welding rods for depositing hard material, of the above designated composition, by either electric arc or oxygen-fuel gas methods. Another object of the invention is to provide welding rods which may be used to produce the desired deposit of hard material and which are relatively inexpensive and simple to manufacture.

The invention comprises welding rods the constituents of which are mechanically associated but not completely alloyed with each other. The unalloyed or partially alloyed ingredients are mixed, preferably with a suitable binder, in proportions which, when the rod is melted during welding, produce a deposit of weld metal having the desired composition. One embodiment of the invention comprises a welding rod which will produce a deposit of weld metal of the above composition and which comprises a wire core containing at least one of the constituents necessary to produce a deposit of weld metal of the above composition and a coating thereon which contains the rest of the needed constituents, bound together and to the said core by a suitable binder. Another embodiment comprises a welding rod which will produce the desired deposit and which comprises a metallic or nonmetallic tube or trough, formed of thin solid, perforated, or screenlike material, and a mixture of comminuted ingredients contained therein, the ingredients of the tube and the mixture contained therein being so chosen and proportioned that the rod will produce a deposit of the desired composition.

The welding rods of the invention are easily made. A successful method comprises mixing the powdered constituents with a binder, such as a sodium silicate solution, for example, until a plastic mass is obtained suitable for forming a rod by extrusion; extruding or otherwise forming the rod; and drying the rod, suitably in an oven at about 80° C. It may be desirable in some cases to include a flux in the mix, and for this purpose borax is well suited. A strong rod results from this treatment, and its strength may be further increased by heating the rod to a higher temperature. For example, by heating a rod to about 1000° C. for about 15 minutes (preferably in a hydrogen or other non-oxidizing atmosphere) its strength may be doubled or trebled. Such treatment does not bring about the incipient fusion generally called "sintering."

In some cases, it may be desirable to produce a rod according to the embodiment of the invention which comprises a welding rod having a wire core and a coating thereon. To produce a rod of this type, a core may be formed of one or more of the more ductile constituents, such as iron, nickel, or cobalt, depending on the composition desired to be deposited on welding with the rod, with which may be associated small amounts of the less ductile constituents. For example, if a relatively high percentage of iron is desired in the weld metal to be deposited by the rod, a ferrous core wire is preferably used. If a relatively low percentage of iron is desired, a core wire of nickel or cobalt is preferable. Added stiffness may be obtained in the rod by twisting two core wires together, for example a nickel wire and a ferrous metal wire. The size of the core depends on the final composition desired and the size of the completed rod. The core wire is coated with the remaining constituents necessary to produce the desired deposit. The coating may be applied by dipping or extrusion or other means and is prepared by mixing the powdered constituents with a binder such as a sodium silicate solution. A flux such as borax may also be included if desired. After coating, the rods are baked and dried.

Similarly, in producing welding rods which comprise a tube or trough filled with comminuted ingredients and a binder, the tube may be formed from one or more of the more ductile components, such as iron and cobalt, the metals selected being chosen with regard to the desired composition of deposited metal. A welding rod of this type may also be made by filling a preformed tube of any material with the powdered ingredients or by deforming a flat strip or screen into a trough, and filling the trough with the remaining ingredients. A trough may be formed into a tube by crimping the edges of the trough together. The finished rod may be baked and dried as described above.

In making the welding rods of the invention it is preferable to use finely powdered materials in order to obtain intimate mixing of the constituents and homogeneous deposits of weld metal. Successful results have been obtained with particles which pass a 100 mesh screen having square apertures 0.0058 inch wide. However, larger particles may be, and have been used, with success. A thick rod may be made from larger particles than can be used conveniently in making a thin rod.

A preferred composition of weld metal to be deposited by the welding rods of this invention comprises 15% to 36% chromium, 5% to 34% metal selected from the group tungsten, molybdenum, vanadium, columbium, and tantalum and mixtures of such metals, 1% to 2.5% carbon, and the remainder substantially all metal of the group consisting of iron, nickel, and cobalt, the iron not exceeding 10%. There may also be included up to 2% boron, up to 5% titanium, up to 3% manganese, and up to 3% silicon.

While it is possible to add at least a part of the alloying elements in the form of oxides, carbides or other compounds of such a nature that they will be reduced or converted to their elemental form during the welding operation, it is preferred to add them as metallic elements or master alloys. It is also possible to use as a binder other materials than sodium silicate, such as casein glue or silicon ester. Similarly, materials other than borax may be used as fluxes, for instance slip clay, but borax is preferred.

Welding rods made according to the invention have been found to be very satisfactory. They produce sound, substantially homogeneous deposits of the desired compositions and are amply strong. They offer an outstanding advantage in ease of manufacture and cheapness of cost, since they produce weld metal surfaces comparable to those produced by alloyed rods at a fraction of the cost of the latter.

I claim:

1. An unsintered welding rod comprising a binder and ingredients at least a substantial part of which are comminuted and unalloyed with the remainder of said ingredients, said ingredients being so chosen and proportioned that the rod when used for fusion-deposition welding produces a deposit having as essential ingredients 12% to 75% of at least one metal of the group consisting of chromium, tungsten, molybdenum, columbium, and tantalum, and the remainder principally metal selected from the group consisting of cobalt, nickel, and iron, together with carbon in an amount not exceeding 4%, the iron content not exceeding 25%.

2. An unsintered welding rod comprising a mixture of comminuted ingredients and a binder, the ingredients being so chosen and proportioned that the welding rod when used for fusion-deposition welding produces a deposit comprising 10% to 40% chromium, 2% to 35% metal selected from the group tungsten and molybdenum, 1% to 4% carbon; and the remainder principally metal selected from the group iron, cobalt, and nickel, the iron content not exceeding 10%.

3. An unsintered welding rod comprising a mixture of comminuted ingredients and a binder, said ingredients being so chosen and proportioned that the welding rod when used for fusion-deposition welding will produce a deposit comprising 15% to 35% chromium, 5% to 30% metal selected from the group tungsten and molybdenum, 1% to 2.5% carbon, and the remainder principally cobalt.

4. An unsintered welding rod comprising a metal core and an adherent coating thereon composed of a mixture of comminuted ingredients and a binder, the core being selected from the group consisting of cobalt and nickel, and the ingredients of the core and coating being so chosen and proportioned that the rod when used for fusion deposition welding will produce a deposit comprising 10% to 40% chromium, 2% to 35% metal selected from the group tungsten and molybdenum, carbon in an amount not over 4%, and the remainder principally metal selected from the group iron, cobalt, and nickel, the iron content not exceeding 10%.

5. An unsintered welding rod comprising a cobalt metal core and an adherent coating on said core composed of a mixture of comminuted ingredients and a binder, the ingredients of the core and coating being so chosen and proportioned that the welding rod when used for fusion-deposition welding will produce a deposit comprising 15% to 35% chromium, 5% to 30% metal selected from the group tungsten and molybdenum, iron in an amount not exceeding 10%, 1% to 2.5% carbon, and the remainder substantially all cobalt.

6. An unsintered welding rod comprising a metal tube and a mixture of comminuted ingredients and a binder contained therein, the tube being selected from the group consisting of cobalt and nickel, and the ingredients of the metal tube and the mixture contained therein being so chosen and proportioned that the rod when used for fusion-deposition welding will produce a deposit comprising 10% to 40% chromium, 2% to 35% metal selected from the group tungsten and molybdenum, 1% to 4% carbon, and the remainder principally metal selected from the group iron, cobalt, and nickel, the iron content not exceeding 10%.

7. An unsintered welding rod comprising a cobalt metal tube and a mixture of comminuted ingredients and a binder contained therein, the ingredients of the tube and the mixture contained therein being so chosen and proportioned that the rod when used for fusion-deposition welding will produce a deposit comprising 15% to 35% chromium, 5% to 30% metal selected from the group tungsten and molybdenum, iron in an amount not exceeding 10%, 1% to 2.5% carbon, and the remainder substantially all cobalt.

WILLIAM A. WISSLER.